United States Patent [19]

McGarvey

[11] Patent Number: 5,056,017

[45] Date of Patent: Oct. 8, 1991

[54] SYSTEM TO MONITOR FUEL LEVEL IN A TANK, AND FUEL DISPENSED FROM THE TANK, TO DETERMINE FUEL LEAKAGE AND THEFT LOSSES

[75] Inventor: David C. McGarvey, San Gabriel, Calif.

[73] Assignee: LRS, Inc., El Monte, Calif.

[21] Appl. No.: 386,813

[22] Filed: Jul. 31, 1989

[51] Int. Cl.⁵ .............................................. G01F 23/00
[52] U.S. Cl. ..................................... 364/403; 72/313; 109/39
[58] Field of Search ................... 364/403, 479, 571.04, 364/571.05; 73/40, 49.2, 290.2, 312-313

[56] References Cited

U.S. PATENT DOCUMENTS

| | | | |
|---|---|---|---|
| 810,237 | 1/1906 | Wadsworth | 417/41 |
| 1,114,019 | 10/1914 | Morris | 417/41 |
| 1,273,195 | 7/1918 | Snyder | 417/41 |
| 1,625,765 | 4/1927 | Ratzenstein | 137/375 |
| 1,724,582 | 7/1915 | Hart | 417/41 |
| 2,460,054 | 1/1949 | Wiggins | 228/65 |
| 2,558,694 | 6/1951 | Speig | 220/428 |
| 2,772,834 | 12/1956 | Swenson et al. | 237/67 |
| 2,864,527 | 12/1958 | Altman et al. | 220/425 |
| 2,869,751 | 1/1959 | Klope et al. | 220/445 |
| 2,931,211 | 4/1960 | McCullough | 52/192 |
| 3,595,424 | 7/1971 | Jackson | 220/444 |
| 3,666,132 | 5/1972 | Yamamoto et al. | 220/480 |
| 3,702,592 | 11/1972 | Gamble | 109/29 |
| 3,827,455 | 8/1974 | Lee | 137/375 |
| 3,952,907 | 4/1976 | Ogden et al. | 137/312 |
| 3,969,563 | 7/1976 | Hollis, Sr. | 428/175 |
| 3,984,032 | 10/1976 | Hyde et al. | 364/479 |
| 4,200,785 | 4/1980 | Evans et al. | 377/55 |
| 4,349,882 | 9/1982 | Asmundsson et al. | 73/304 |
| 4,376,489 | 3/1983 | Clemens | 220/1.5 |
| 4,427,132 | 1/1984 | Thomson | 73/290 |
| 4,651,893 | 3/1987 | Mooney | 220/445 |
| 4,685,327 | 8/1987 | Sharp | 73/49.2 |
| 4,697,618 | 10/1987 | Youtt et al. | 137/587 |
| 4,815,621 | 3/1990 | Bartis | 220/1 |
| 4,826,644 | 5/1989 | Lindquist et al. | 264/71 |
| 4,835,522 | 5/1989 | Andrejasich et al. | 73/49.2 |
| 4,844,287 | 7/1989 | Long | 220/449 |
| 4,890,983 | 1/1990 | Solomon et al. | 417/41 |
| 4,931,235 | 5/1989 | Lindquist et al. | 264/40.1 |

OTHER PUBLICATIONS

Uniform Fire Code, 1985 Ed., pp. 203-278.
Reliance Tank sales materials (undated)—price list date 1-20-89.
Agape Tank Sales materials (dated by postmark Jun. 7, 1989).
Doehrman, Inc.—facsimile dated May 9, 1989.
Safe-T-Tank Corp. sales materials dated 1987—sales materials from Air Boy (Jun. 1988)—advertisement dated Feb. 1987 from Keesee, "Lube Cube" sales materials dated Jul. 1, 1988.
UL 142 Standard for Safety, Steel Aboveground Tanks (1987).
Husky 1030 Double Diaphragm Pump (1987), instructions and parts list.
"Oil Evacuation System", Aro Corp. (1982).
"½ Waste Oil Evacuation System", (drawing dated Mar. 15, 1987).
"Aro Air Operated Diaphragm Pumps", (1986).
"Aro Lubrication Equipment", (1989), pp. 31 and 33.
Cla-val Co. float control parts list (1977).

Primary Examiner—Gail O. Hayes
Attorney, Agent, or Firm—William W. Haefliger

[57] ABSTRACT

Apparatus is provided to monitor fuel level in a tank, and to monitor fuel pumped from a dispenser or dispensers; and outputs from the monitoring equipment are processed to determine unwanted loss of fuel from the tank.

8 Claims, 3 Drawing Sheets

SYSTEM TO MONITOR FUEL LEVEL IN A TANK, AND FUEL DISPENSED FROM THE TANK, TO DETERMINE FUEL LEAKAGE AND THEFT LOSSES

BACKGROUND OF THE INVENTION

This invention relates generally to monitoring liquid fuel inventory in a tank from which liquid fuel is dispensed, as via a metering means; and more particularly, it concerns monitoring both the metering means and the level of liquid fuel in the tank to enable detection of loss of liquid fuel from the tank, as from leakage or pilfering. The invention is especially adapted to underground tanks from which leakage to the exterior is not readily detectable.

During the time that liquid fuel is not dispensed from an underground tank, leakage can be detected by observing changes in the liquid top surface level in the tank. However, if liquid fuel is being intermittently dispensed from the tank, as via a pump and metering means, it is clear that changes in top surface level liquid fuel in the tank do not per se reflect leakage. There is need for accurate, reliable and simple means to monitor both liquid level in the tank as well as the amount of liquid dispensed from the tank, as via the pump and metering means, in order to arrive at an accurate determination of any such "unwanted loss". The latter can arise for example from drainage through small holes in the tank, or from pilferage from the tank, as via an inlet to the tank, or pilferage from hoses or lines leading from the tank to the dispenser.

SUMMARY OF THE INVENTION

It is a major object of the invention to provide improved apparatus to monitor liquid fuel inventory in a tank, such as an underground tank, and from which liquid fuel is intermittently dispensed, as via a pump or pumps and metering means. In this regard, pulser means is provided to produce electrical pulses corresponding to volumetric increments of liquid fuel dispensed; and the invention further includes:

a) interface means operatively connected to the pulser means to sense the pulses and to convert the pulses into a first volume indicating data stream, b) the interface means also connected to sensor means at the tank to sense liquid level in the tank and to provide a second volume indicating data stream, c) and computer means operatively connected to the interface means to receive the first and second data values and to process same for providing an output indicative of leakage from the tank.

As will be seen, the pulser means typically includes a pulse detector unit attachable to the dispenser means, and a pulse counter operatively connected with the detector unit to accumulate a pulse count indicative of the first volume of dispenser fuel.

It is a further object of the invention to provide mean connected with the pulse detector unit for operatively coupling the unit to a rotary part associated with the dispenser, the part rotating as a function of liquid fuel dispensed by the dispenser means.

It is another object of the invention to provide a processor unit coupled between the pulse counter and the interface means.

In one embodiment, the interface means includes a pulse detection unit, a pulse counter unit and a converter unit which accumulates pulses until a lapse in flow is detected, at which point the counted number of pulses is converted to a volumetric indication of liquid fuel dispensed. Such a volumetric indication can then be compared with detected volume change in the tank, in order to detect leakage.

These and other objects and advantages of the invention, as well as the details of an illustrative embodiment, will be more fully understood from the following specification and drawings, in which:

DRAWING DESCRIPTION

DETAILED DESCRIPTION

Figure 1:
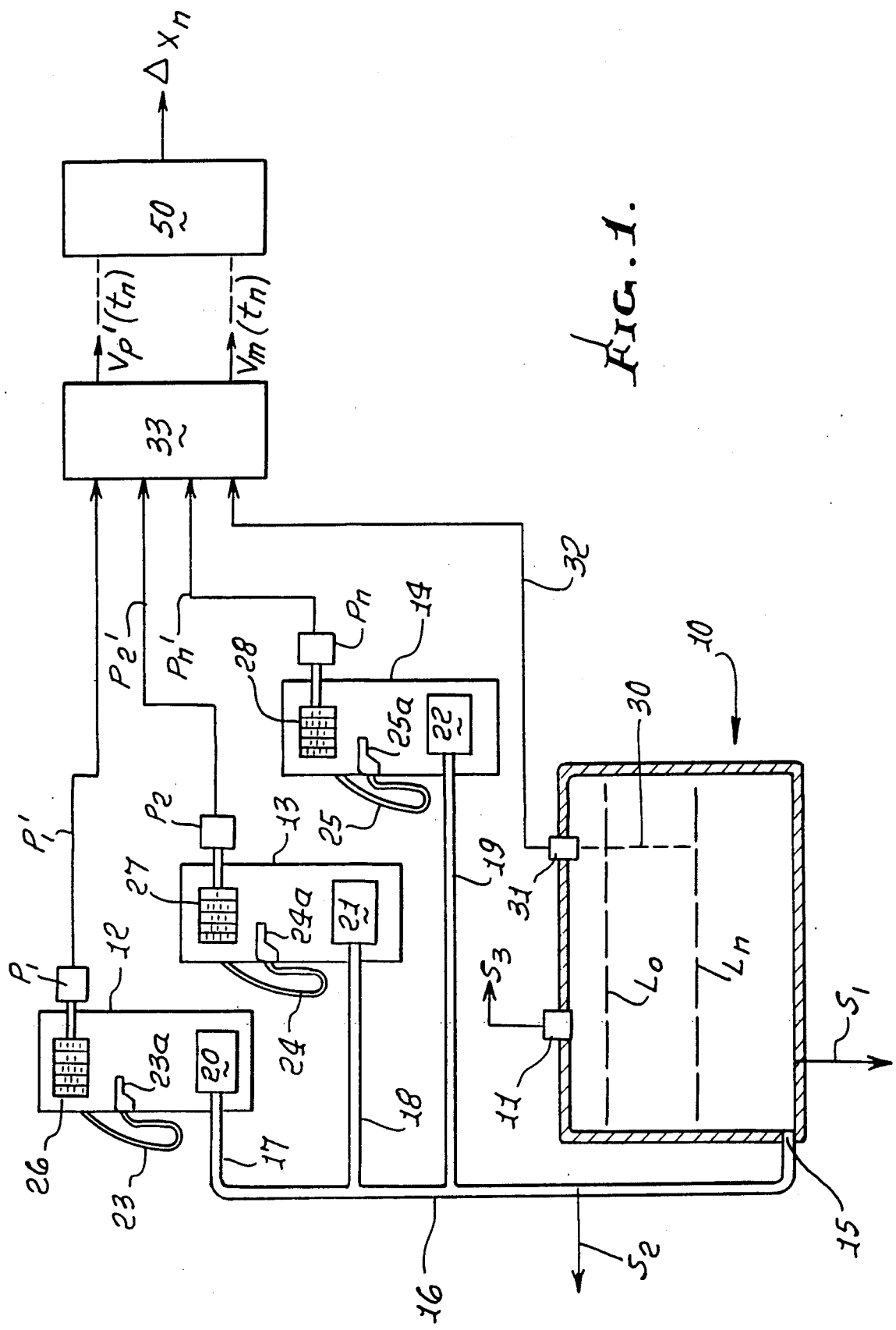
FIG. 1 is a system diagram.

Referring to FIG. 1, a liquid fuel tank 10 has an inlet port at 11 and receives liquid fuel up to a "filled" level $L_o$. Liquid fuel is pumped from the tank to one or more dispenser units as at 12, 13 and 14, as via a tank outlet port 15, main line 16, and branch lines 17-19. The dispenser units may for example include or comprise gasoline or other fuel dispensers having pumps 20-22 activated when triggers associated with nozzles 23a, 24a and 25a on hoses 23-25 are selectively manually displaced. The dispenser units include display registers 26-28 to indicate volume of fuel pumped and dispensed, as to automobiles.

Fuel loss or shrinkage from the tank 10 can occur as for example by leakage, indicated at $S_1$, pilferage indicated at $S_2$, or evaporation or other, indicated at $S_3$. It is a purpose of the invention to provide a system that will indicate the amount of volume of fuel loss from the tank, over a period of time after fuel has been initially filled into the tank to level $L_o$.

Figure 2:
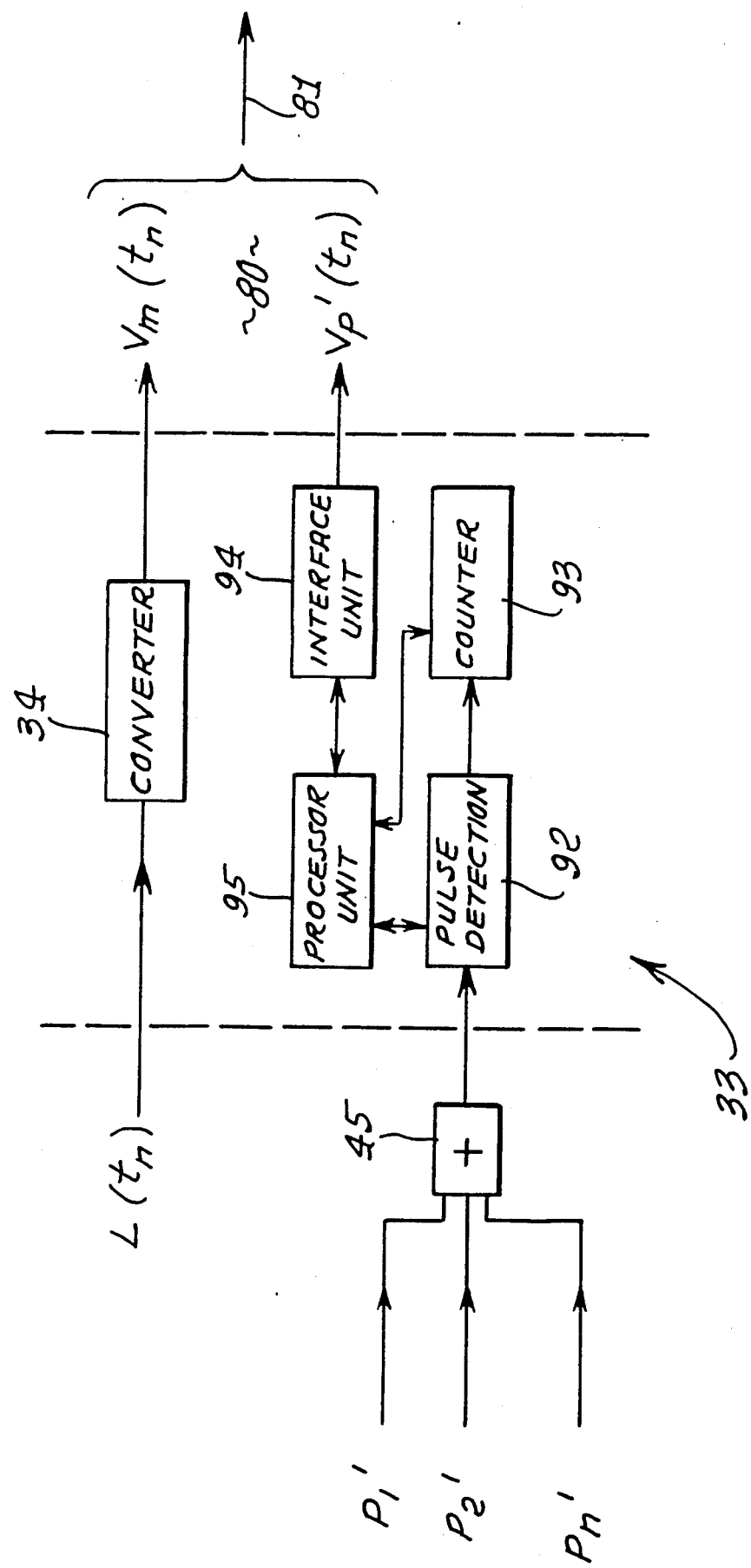
FIG. 2 is a functional block diagram, showing circuitry.

As shown in FIGS. 1 and 2, a fuel level detector is mounted on the tank to detect fuel level in the tank. That detector may for example be of known type that acoustically determines fuel level, as by transmitting acoustic waves 30 from a transmitter/receiver unit 31 mounted on the tank top, timing of wave travel from the transmitter at 31, to the surface level of the fuel, and back up to the receiver being detected to produce a readout L $(t_n)$ of surface level, i.e., at time $t_n$. At time $t_o$, the level is $L_o$, i.e., full level.

FIG. 1 shows the output 32 of the detector as transmitted to an interface means or processor 33, where a converter 34 converts the output value L $(t_n)$ to a data stream $V_m(t_n)$, i.e., measured volume of fuel leaving the tank between detected levels $L_o$ and $L_n$. Volume is a function of fuel level, so that conversion involves multiplication of the difference $(L_o - L_n)$ by a known conversion factor to produce $V_m(t_n)$, i.e., at time $t_n$.

Figure 3:
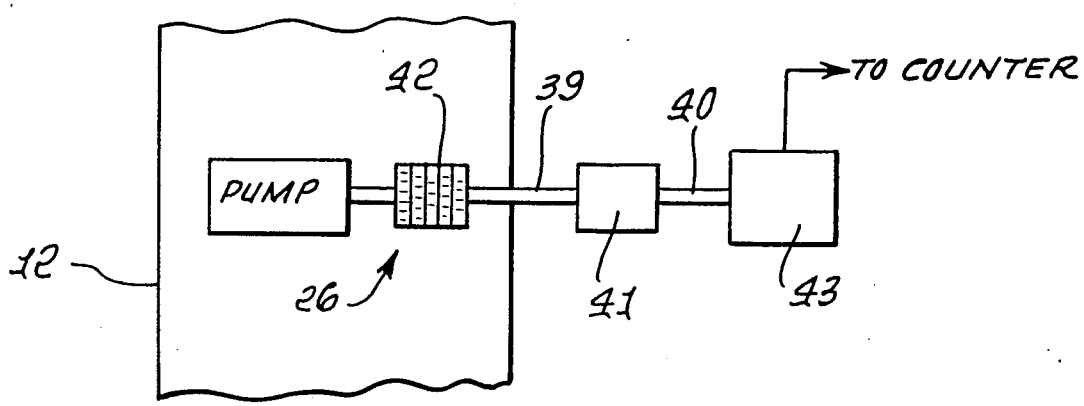
FIG. 3 is an elevation showing coupling of a pulse generator to a fuel dispenser register.

In accordance with the invention, and referring to FIGS. 1 and 3, the amount of fuel pumped at each dispenser is detected by pulser means $P_1$, $P_2$—$P_n$, whose outputs are transmitted at $P_1^1$, $P_2^1$ and $P_n^1$ to the interface means 33. Those outputs consist of a series of pulses generated as by a pulser having a rotary shaft 40 coupled at 41 to the shaft 39 of register wheel 42 at each dispenser. Wheel 42 rotates in proportion to the amount of fuel pumped and dispensed.

A detector 43 detects rotation of the shaft 40, i.e., counts its rotation (as for example by magnetic coupling of a fixed coil past which a magnet on the shaft travels as the shaft rotates, electric pulses then produced in the coil). Such a pulser is easily connected to an existing dispenser, as via coupling to a register shaft, as referred to.

The outputs $P_1^1$, $P_2^1$—$P_n^1$ are summed or combined as at 45 in FIG. 2, and transmitted to the interface means 33, which converts the combined pulses to an output $V_p^1(t_n)$—i.e., corresponding to the total volume of fuel pumped by the dispensers between times $t_o$ and $t_n$, corresponding to levels $L_o$ and $L_n$ as referred to above. In this regard, it may be assumed that fuel remains in lines 16-19, at all times.

The two outputs $V_m(t_n)$ and $V_p^1(t_n)$ of the interface means 33 may then be combined as at 80 and serially transmitted, in digital form, at 81 to a computer 50 which calculates the difference between them to arrive at a value $\Delta X_n$, which indicates, at time $t_n$, the total loss or leakage of fuel from the tank between times $t_o$ and $t_n$.

In this regard, the computer is programmed to provide the conversion function or factors referred to, s that the interface means 33 may then serve mainly to convert the pulse counts from the dispensers to a data stream $V_p^{11}(t_n)$, and combine that stream with the data stream $V_m^{11}(t_n)$ produced from the output $L(t_n)$ of the tank level detector, for serial transmission to the computer.

Figure 4:
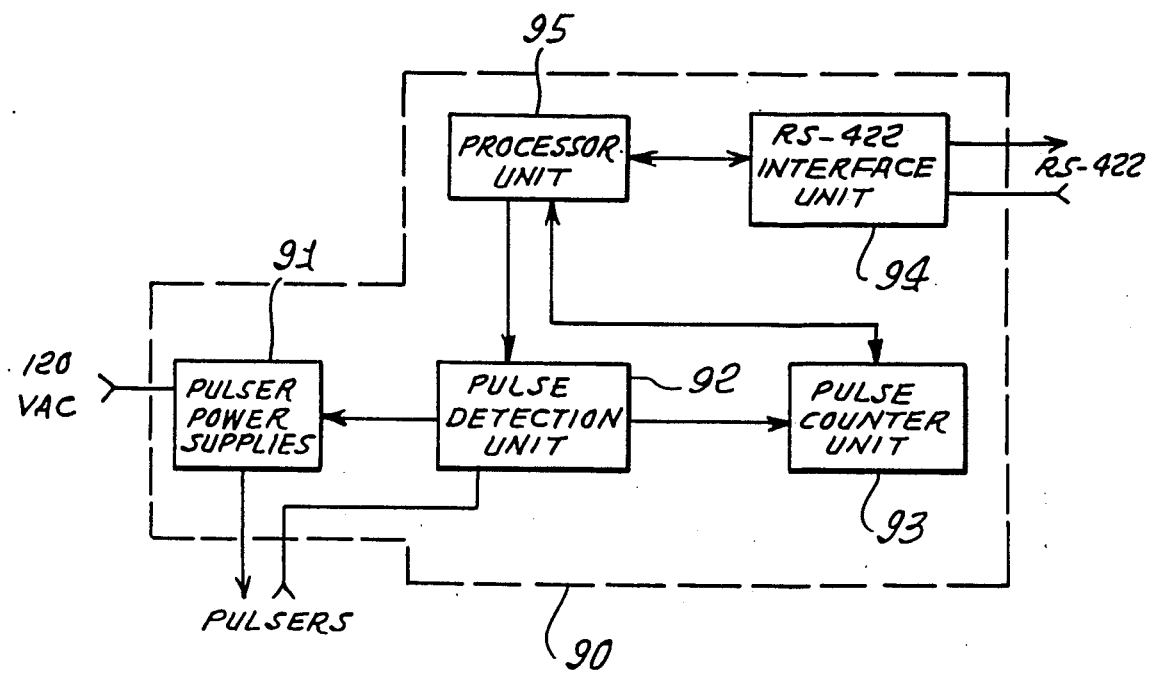
FIG. 4 is another functional block diagram.

FIG. 4 shows in block diagram form the circuitry to process the pulses $P_1^1$, $P_2^1$—$P_n^1$. As shown, a pulse detection interface unit 90 consists of a pulser power supply subsystem 91, pulse detection and counting subsystem, and a data converter and transmission subsystem. The pulser power supply, pulse detection, subsystem 92 and counting subsystem 93 function together to count and accumulate pulses generated by the external pulser which is located on a fuel dispenser. These pulser units measure the mechanical rotation of the dispenser pump metering system and generate electrical current pulses indicating the product flow-rate. Such a system typically generates 1000 pulses per gallon of produce dispensed.

The interface unit 94 accumulates the number of pulses for fuel dispensed by each hose of the remote dispenser unit until a lapse in the product flow is detected by the interface unit. When the lapse is detected, the interface unit immediately converts the number of pulses to gallons of product pumped and transmits this value in a computer readable ASCII (American Standard Code for Information Interchange) format to a remote computer device, as at 50. The format of this ASCII transmission can be varied by the manufacturer to suit the needs of the particular computer device receiving the transmission. Processor unit 95 is connected as shown.

The electrical communication link is shown on the block diagram as an E.I.A. (Electronic Industries Association) RS-422 Standard. This can be modified at the customers request to an E.I.A. RS-232 communications Standard.

I claim:

1. In apparatus to monitor liquid fuel inventory in a tank, and employing dispenser means to dispense liquid fuel from the tank, and including pulse producing means that produces electrical pulses corresponding to volumetric increments of liquid fuel dispensed, the combination comprising:
    a) interface means operatively connected to said pulse producing means to sense said pulses from time $t_o$ to time $t_n$ and to convert said pulses into first volume indicating data values corresponding to amount of fuel dispensed from the tank between $t_o$ and $t_n$,
    b) sensor means at the tank to sense liquid level in the tank at $t_o$ and at $t_n$ and said interface means operatively connected to said sensor means, to provide second volume indicating data values corresponding to the amount of fuel leaving the tank by said dispensing and also by any theft or leakage, between $t_o$ and $t_n$,
    c) and computer means operatively connected to said interface means to receive said first and second data values and to process said first and second data values for providing an output indicative of non-dispensed loss from the tank.

2. The combination of claim 1 wherein said pulse producing means and interface unit include a pulse detector unit attachable to the dispenser means, and means including a pulse counter operatively connected with the detector unit to accumulate a pulse count indicative of said first volume indicating data values.

3. The combination of claim 2 including means connected with said pulse detector unit for operatively coupling said unit to a rotary part associated with the dispenser, said part rotating as a function of liquid fuel dispensed by the dispenser means.

4. The combination of claim 2 including a processor unit coupled between said pulse counter and said interface means.

5. The combination of claim 1 wherein said interface means and said computer means are spaced from said tank and said dispenser means.

6. In apparatus to maintain liquid loss from a tank, in a system wherein liquid is dispensed from the tank via dispenser means which has an associated dispenser fluid accumulative output, the combination comprising
    a) first means to monitor liquid fuel level in the tank and to provide a first output indicative of liquid volume loss from the tank, over a time interval $t_o$—$t_n$,
    b) second means to monitor liquid dispensed by said dispenser means to provide a second output indicative of liquid volume dispensed, over said time interval $t_o$—$t_n$,
    c) and processor means to process said first and second outputs and to detect any difference therebetween.

7. In the method of monitoring liquid fuel inventory in a tank, and employing dispenser means to dispense liquid fuel from the tank, and pulse producing means that produce electrical pulses corresponding to volumetric increments of liquid fuel dispensed, the steps comprising:
    a) providing interface means operatively connected to said pulse producing means for sensing said pulses, said interface means converting said pulses into first volume indicating data values,
    b) providing sensor means at the tank to sense liquid level in the tank and connecting said sensor means to said interface means to provide second volume indicating data values,
    c) and providing computer means operatively connected to said interface means to receive said first and second data values over the same time interval and to process same for providing an output indicative of loss from the tank during said interval.

8. The method of claim 7 wherein said pulse producing means and said interface means include a pulse detector unit, and means including a pulse counter connected with the detector means, and attaching said pulse producing means to the dispenser means, and operating said pulse counter to accumulate a pulse count indicative of said first volume indicating data values.

* * * * *